United States Patent
Sugiura et al.

(10) Patent No.: US 11,174,406 B2
(45) Date of Patent: *Nov. 16, 2021

(54) OIL-BASED INKJET INK

(71) Applicant: RISO KAGAKU CORPORATION, Tokyo (JP)

(72) Inventors: Hikaru Sugiura, Ibaraki (JP); Kazuyuki Ando, Ibaraki (JP); Shinsuke Ozawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 785 days.

This patent is subject to a terminal disclaimer.

(21) Appl. No.: 15/935,384

(22) Filed: Mar. 26, 2018

(65) Prior Publication Data

US 2019/0085194 A1    Mar. 21, 2019

(30) Foreign Application Priority Data

Mar. 30, 2017  (JP) .............................. JP2017-067840
Mar. 26, 2018  (JP) .............................. JP2018-057983

(51) Int. Cl.

| | |
|---|---|
| *C09D 11/00* | (2014.01) |
| *C09D 11/36* | (2014.01) |
| *C09D 11/326* | (2014.01) |
| *C09D 11/037* | (2014.01) |
| *C09D 11/033* | (2014.01) |
| *C09D 11/322* | (2014.01) |
| *C09D 11/324* | (2014.01) |
| *C09D 13/00* | (2006.01) |

(52) U.S. Cl.
CPC ............ *C09D 11/36* (2013.01); *C09D 11/033* (2013.01); *C09D 11/037* (2013.01); *C09D 11/322* (2013.01); *C09D 11/324* (2013.01); *C09D 11/326* (2013.01)

(58) Field of Classification Search
USPC ............ 106/31.01, 31.13, 31.6, 31.85, 31.86
See application file for complete search history.

(56) References Cited

U.S. PATENT DOCUMENTS

| | | | |
|---|---|---|---|
| 7,393,400 | B2 | 7/2008 | Kitawaki et al. |
| 7,897,657 | B2 | 3/2011 | Nakano et al. |
| 8,292,996 | B2 | 10/2012 | Kuriyama et al. |
| 10,640,665 | B2 | 5/2020 | Seki et al. |
| 10,865,320 | B2 | 12/2020 | Shimura et al. |
| 2007/0022904 | A1* | 2/2007 | Kitawaki ............... C09D 11/36 106/31.86 |
| 2007/0101901 | A1 | 5/2007 | Endo et al. |
| 2009/0090271 | A1* | 4/2009 | Wynants ............... C09D 11/101 106/31.78 |
| 2010/0174013 | A1 | 7/2010 | Sugita et al. |
| 2012/0056929 | A1 | 3/2012 | Sao et al. |
| 2012/0266779 | A1 | 10/2012 | Morinaga et al. |
| 2012/0293581 | A1 | 11/2012 | Aoki et al. |
| 2013/0113866 | A1 | 5/2013 | Shimomura |
| 2015/0184012 | A1 | 7/2015 | Endo et al. |
| 2017/0165966 | A1 | 6/2017 | Ito et al. |

FOREIGN PATENT DOCUMENTS

| | | |
|---|---|---|
| CN | 101198664 | 6/2008 |
| CN | 101560347 | 10/2009 |
| CN | 101688078 | 3/2010 |
| CN | 102190926 | 9/2011 |
| CN | 103146243 | 6/2013 |
| CN | 106133072 | 11/2016 |
| CN | 108504191 | 9/2018 |
| EP | 3604461 | 2/2020 |
| JP | 57-6790 | 1/1982 |
| JP | 57006790 A * | 1/1982 |
| JP | 2002363465 A | 12/2002 |
| JP | 2005171032 A | 6/2005 |
| JP | 2007126564 A | 5/2007 |
| JP | 2007-154149 A | 6/2007 |
| JP | 2010215700 A | 9/2010 |
| JP | 2011162757 A | 8/2011 |
| JP | 20120052057 A | 3/2012 |

(Continued)

OTHER PUBLICATIONS

Official Action issued for the counterpart European Patent Application No. 18164498.0, dated Nov. 19, 2020, 23 pages.
International Search Report and Written Opinion issued for International Patent Application No. PCT/JP2018/012116, dated May 15, 2018, 8 pages.
International Search Report and Written Opinion issued for International Patent Application No. PCT/JP2018/012118, dated May 15, 2018, 8 pages.
International Search Report and Written Opinion issued for International Patent Application No. PCT/JP2018/012119, dated May 15, 2018, 9 pages.
International Search Report and Written Opinion issued for International Patent Application No. PCT/JP2018/012120, dated May 15, 2018, 10 pages.

(Continued)

*Primary Examiner* — James E McDonough
(74) *Attorney, Agent, or Firm* — Hamre, Schumann, Mueller & Larson, P.C.

(57) ABSTRACT

An ink is provided which can prevent the deformation and degradation of resin products by printed items, and is also suitable for inkjet printing. The oil-based inkjet ink contains a colorant and a fatty acid ester-based solvent represented by general formula (1) shown below and having 12 to 23 carbon atoms in one molecule.

General formula (1)

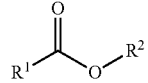

(In general formula (1), each of $R^1$ and $R^2$ independently represents an alkyl group, and at least one of the alkyl groups of $R^1$ and $R^2$ is a branched alkyl group having a side chain of at least 4 carbon atoms.).

16 Claims, No Drawings

(56) References Cited

FOREIGN PATENT DOCUMENTS

| JP | 2012224781 A | 11/2012 |
| JP | 2012254620 A | 12/2012 |
| JP | 2013072057 A | 4/2013 |
| JP | 2013095885 A | 5/2013 |
| JP | 2014019766 A | 2/2014 |
| JP | 2015124381 A | 7/2015 |
| JP | 2006-065200 | 4/2016 |
| JP | 2016191028 A | 11/2016 |
| JP | 20170105046 A | 6/2017 |

OTHER PUBLICATIONS

Extended European Search Report, European Patent Application No. 18164498.0, dated Jul. 12, 2018 (6 pages).

Yǒujī huàxué, "Organic chemistry" 21S Hiji Gaodeng Yuanxiao, Yingyongxing Guihua Jiocai, Apr. 2009, p. 172-173; A concise explanation of relevance provided in the attached Chinese Office Action.

Office Action issued for the counterpart Chinese Patent Application No. 201810266246.1, dated Oct. 10, 2020, 15 pages including machine translation.

U.S. Appl. No. 16/497,725, filed Sep. 25, 2019, Unknown.

Zhang Dengxia, Polyacrylate transparent plastics, petrochemical industry press, Aug. 1975, 1st edition, p. 47; English translation provided.

Encyclopedia of Chemical Engineering (vol. 19), editorial board of Encyclopedia of chemical engineering, chemical industry press, Sep. 1998, 1st edition, p. 231; English translation provided.

Office Action issued for the counterpart Chinese application No. 201810266246.1, dated Apr. 19, 2021, 10 pages.

Office Action issued for the counterpart Chinese patent application No. 201880020540.2, dated Aug. 2, 2021, 7 pages.

Office Action issued for the counterpart Chinese patent application No. 201880020390.5, dated Jul. 19, 2021, 7 pages.

* cited by examiner

OIL-BASED INKJET INK

CROSS REFERENCE TO RELATED APPLICATIONS

This Application is based upon and claims the benefit of priority from prior Japanese Patent Application No. 2017-067840 filed on Mar. 30, 2017, the entire contents of which are incorporated by reference herein, and prior Japanese Patent Application No. 2018-057983 filed on Mar. 26, 2018, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

When a printed item having an image formed using an oil-based inkjet ink is stored by insertion in a clear file formed from polypropylene (PP) or the like, a problem arises in that the clear file tends to deform. One reason for this deformation is that when the clear file contacts the printed surface, the ink components cause one surface of the clear file to swell.

Patent Document 1 JP 2007-154149 A) proposes an inkjet non-aqueous ink composition having superior discharge stability that neither swells nor greatly deforms transparent files, the ink containing a pigment, a dispersant and a non-aqueous solvent, wherein at least 50% of the total weight of the non-aqueous solvent is composed of an ester-based solvent having at least 24 but not more than 36 carbon atoms.

SUMMARY OF THE INVENTION

One embodiment of the present invention provides an oil-based inkjet ink containing a colorant and a fatty acid ester-based solvent represented by general formula (1) shown below and having 12 to 23 carbon atoms in one molecule.

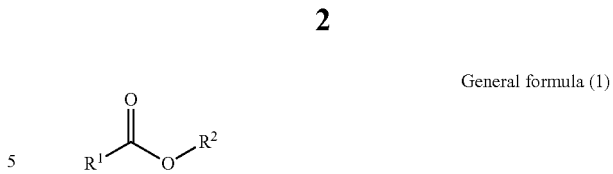

General formula (1)

(In general formula (1), each of $R^1$ and $R^2$ independently represents an alkyl group, and at least one of the alkyl groups of $R^1$ and $R^2$ is a branched alkyl group having a side chain of at least 4 carbon atoms.)

DETAILED DESCRIPTION OF THE EMBODIMENTS

The present invention is described below using embodiments. However, the examples presented in the following embodiments in no way limit the present invention.

Ester-based solvents having a high carbon number have comparatively high viscosities, and therefore satisfactory discharge performance from the inkjet nozzles tends to be difficult to achieve with inks that use these ester-based solvents. In Patent Document 1, the ink is heated to lower the viscosity prior to discharge.

Moreover, even with an ester-based solvent having a high carbon number, if the alkyl group is linear or the side chains are short, then clear file deformation can sometimes not be adequately prevented.

For example, the 2-hexyldecyl isostearate used in Patent Document 1 has 34 carbon atoms, and the number of carbon atoms in the side chain on the fatty acid side is unclear. As a result, there is a possibility of a deterioration in the discharge performance.

Furthermore, the inks of Comparative Examples 1 to 7 in Patent Document 1 use ester-based solvents in which the number of carbon atoms in the solvent is 23 or less, but because a branched structure is not specified, clear file deformation occurs. Ester-based solvents having a low carbon number have comparatively low viscosities and are useful in improving the discharge performance, but suffer from the problem of clear file deformation.

An object of the present invention is to provide an ink that can prevent the deformation and degradation of resin products by printed items, and is also suitable for inkjet printing.

An oil-based inkjet ink according to one embodiment (hereafter also referred to as simply "the ink") contains a colorant and a fatty acid ester-based solvent represented by general formula (1) shown below and having 12 to 23 carbon atoms in one molecule.

General formula (1)

(In general formula (1), each of $R^1$ and $R^2$ independently represents an alkyl group, and at least one of the alkyl groups of $R^1$ and $R^2$ is a branched alkyl group having a side chain of at least 4 carbon atoms.)

This embodiment is able to provide an ink that can prevent the deformation and degradation of resin products by printed items, and is also suitable for inkjet printing.

In particular, by using this ink, when a printed item is inserted into a clear file formed from polypropylene (PP) or the like, deformation of the clear file can be prevented. The clear file may be a transparent or semi-transparent resin sheet, or may also be a colored non-transparent resin sheet.

When the inside surface of a clear file contacts a printed item, the ink components act upon the clear file, which can sometimes cause a change in the volume of the inside surface of the clear file, resulting in a deformation in which the clear file warps. It is thought that this phenomenon becomes particularly marked when ink components, and particularly solvent components, enter micropores in the clear file surface, causing swelling of the clear file.

With this ink, by using a fatty acid ester-based solvent having a side chain of at least 4 carbon atoms, the side chain portion provides steric hindrance, and can prevent the fatty acid ester-based solvent from entering the micropores in the clear file surface. By using this fatty acid ester-based solvent, clear file deformation caused by printed items can be prevented.

Fatty acid ester-based solvents that do not include a side chain of at least 4 carbon atoms exhibit less steric hindrance and are more likely to enter the micropores in the clear file surface, and therefore tend to be more likely to swell the clear file. Commercially available fatty acid ester-based solvents are generally esterification products of an alcohol and a fatty acid that is either linear or has a short side chain of 3 or fewer carbon atoms, and therefore clear file deformation has tended to be a problem with conventional inks.

Further, in the fatty acid ester-based solvent, because the number of carbon atoms in one molecule is at least 12, and at least one of the alkyl groups of $R^1$ and $R^2$ has a side chain of at least 4 carbon atoms, any reduction in the boiling point can be suppressed, meaning clear file deformation can be even better prevented. Low-boiling point solvents tend to be more likely to volatilize from the printed item and contact the clear file surface.

Furthermore, because this fatty acid ester-based solvent has a high boiling point while exhibiting comparatively low viscosity, when the ink is mounted in an inkjet printer, the discharge characteristics of the ink from the inkjet nozzles can be improved. Further, because this fatty acid ester-based solvent has a comparatively high boiling point, volatilization of the ink from the inkjet nozzles can be prevented, and any deterioration in the discharge performance can be prevented over a long period of time.

The ink may contain a pigment, a dye, or a combination of the two as the colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments such as copper phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

From the viewpoints of discharge stability and storage stability, the average particle size of the pigment is preferably not more than 300 nm, more preferably not more than 200 nm, even more preferably not more than 150 nm, and most preferably 100 nm or less.

The amount of the pigment is typically from 0.01 to 20% by mass relative to the total mass of the ink, and from the viewpoints of the print density and ink viscosity, is preferably from 1 to 15% by mass, and more preferably from 4 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates), and 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multi-chain polymeric nonionic dispersants) (all product names), manufactured by DKS Co., Ltd.; DISPERBYK 2155 and 9077 (both product names), manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, preferably from 0.01 to 6% by mass, and more preferably from 0.1 to 6% by mass, relative to the total mass of the ink.

For the dye, any of the dyes typically used in this technical field may be used. In the case of an oil-based ink, the use of an oil-soluble dye is preferred, as it exhibits better affinity with the non-aqueous solvent of the ink, resulting in superior storage stability.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of two or more dyes may be used.

The amount of the dye is typically from 0.01 to 20% by mass relative to the total mass of the ink, and from the viewpoints of the print density and ink viscosity, is preferably from 1 to 15% by mass, and more preferably from 4 to 10% by mass.

The non-aqueous solvent contains the fatty acid ester-based solvent represented by the above general formula (1). By using this fatty acid ester-based solvent, when a printed item is stored in a clear file, deformation of the clear file can be prevented. Further, the discharge performance from the inkjet nozzles can also be improved.

In general formula (1), each of $R^1$ and $R^2$ independently represents an alkyl group, and at least one of the alkyl groups of $R^1$ and $R^2$ is a branched alkyl group having a side chain of at least 4 carbon atoms.

One of $R^1$ and $R^2$ may be a linear alkyl group, provided the other of $R^1$ and $R^2$ has a side chain of at least 4 carbon atoms. Further, $R^1$ and $R^2$ may both have a side chain of at least 4 carbon atoms. If only one of $R^1$ and $R^2$ is a branched alkyl group having a side chain of at least 4 carbon atoms, then the other of $R^1$ and $R^2$ may have a side chain of 3 or fewer carbon atoms.

Further, each of $R^1$ and $R^2$ preferably independently has only one side chain of at least 4 carbon atoms, but may also have two or more such side chains.

For each of $R^1$ and $R^2$, the main chain is deemed to be the carbon chain having the largest number of carbon atoms counting from the carbon atom that is bonded to the ester linkage (—COO—). A carbon chain that branches from this main chain of $R^1$ and $R^2$ is called a side chain. When $R^1$ and/or $R^2$ has a side chain, each side chain may be linear or branched. Further, in $R^1$ or $R^2$, in those cases where a plurality of carbon chains exist which have the largest number of carbon atoms counting from the carbon atom bonded to the ester linkage, the chain having a side chain with the most carbon atoms is deemed to be the main chain.

Further, in $R^1$ or $R^2$, in those cases where a plurality of carbon chains exist which have the largest number of carbon atoms counting from the carbon atom bonded to the ester linkage, and each side chain included in the plurality of carbon chains includes the same number of carbon atoms, the chain having a side chain with the fewest number of side chains is deemed to be the main chain.

The side chain contained in at least one of $R^1$ and $R^2$ preferably has at least 4 carbon atoms. This enables better prevention of clear file deformation.

Further, the side chain contained in at least one of $R^1$ and $R^2$, although not particularly limited, may have 10 or fewer carbon atoms, and preferably has not more than 8 carbon atoms, and more preferably 6 or fewer carbon atoms.

Examples of the side chain of at least 4 carbon atoms include an n-butyl group (C4), isobutyl group (C4), tert-butyl group (C4), pentyl group (C5), hexyl group (C6), heptyl group (C7), octyl group (C8), isooctyl group (C8), nonyl group (C9) and decyl group (C10).

Preferred side chains include an n-butyl group, hexyl group and octyl group, and an n-butyl group and hexyl group are particularly preferred.

The number of carbon atoms in the main chain of each of the alkyl groups of $R^1$ and $R^2$ is, independently, preferably at least 6, and more preferably 8 or greater.

Further, the number of carbon atoms in the main chain of each of the alkyl groups of $R^1$ and $R^2$ is, independently, preferably not more than 13, more preferably not more than 12, and even more preferably 10 or fewer.

The numbers of carbon atoms in the side chains and main chains of $R^1$ and $R^2$ may be adjusted in accordance with the lengths of the respective main chains, the number of carbon atoms in the side chains, and the total number of carbon atoms in the overall fatty acid ester-based solvent.

The total number of carbon atoms in each of the alkyl groups $R^1$ and $R^2$ may be, independently, within a range from 9 to 21 when the alkyl group has a side chain of at least 4 carbon atoms, or may be within a range from 1 to 13 when the alkyl group is either linear or has a side chain of 3 or fewer carbon atoms.

The total number of carbon atoms in each of the alkyl groups $R^1$ and $R^2$ is, independently, preferably at least 6, more preferably at least 8, and even more preferably 9 or greater.

Further, the total number of carbon atoms in each of the alkyl groups $R^1$ and $R^2$ is, independently, preferably not more than 18, more preferably not more than 14, and even more preferably 13 or fewer.

The total number of carbon atoms in each of $R^1$ and $R^2$ may be adjusted in accordance with the lengths of the respective main chains, the number of carbon atoms in the side chains, and the total number of carbon atoms in the overall fatty acid ester-based solvent.

By ensuring that the total number of carbon atoms in each of $R^1$ and $R^2$ is, independently, at least 6, more preferably at least 8, and even more preferably 9 or greater, odor generation from the ink can be prevented. Fatty acid ester-based solvents can sometimes decompose into a fatty acid component and an alcohol component during storage of the ink, and progression of this decomposition tends to be particularly problematic under conditions of high temperature and high humidity. When the carbon number of a decomposition product is small, the decomposition product tends to volatilize from the ink and can cause odors. Accordingly, by increasing the number of carbon atoms in the fatty acid component and the alcohol component that constitute the fatty acid ester-based solvent, the fatty acid ester-based solvent can be prevented from becoming a cause of odors. More specifically, the total number of carbon atoms in each of $R^1$ and $R^2$ is preferably at least 6, more preferably at least 8, and even more preferably 9 or greater.

By ensuring that the total number of carbon atoms in each of $R^1$ and $R^2$ is, independently, at least 6, and more preferably at least 8, the solubility of the oil-based inkjet ink in toner images formed using a toner ink can be lowered. Specifically, if a toner printed item having an image formed using a toner ink and a printed item produced using the oil-based inkjet ink are superimposed, then the printed item produced using the oil-based inkjet ink can be prevented from sticking to the toner printed item. More specifically, the number of carbon atoms in each of $R^1$ and $R^2$ is preferably at least 6, and more preferably 8 or greater.

The number of carbon atoms in one molecule of the fatty acid ester-based solvent is preferably at least 12, more preferably at least 18, and even more preferably 20 or greater. Ensuring that the number of carbon atoms in the fatty acid ester-based solvent satisfies this range ensures a satisfactory number of carbon atoms in the main chains and side chains of the alkyl groups, and can therefore prevent the fatty acid ester-based solvent from entering micropores in the clear file surface, thus preventing clear file deformation. Further, by ensuring that the number of carbon atoms in one molecule of the fatty acid ester-based solvent is preferably at least 12, more preferably at least 18, and even more preferably 20 or greater, the volatility of the ink can be further reduced.

Further, the number of carbon atoms in one molecule of the fatty acid ester-based solvent is preferably not more than 23, and more preferably 22 or fewer. Because the viscosity increases as the number of carbon atoms increases, ensuring that the number of carbon atoms in the fatty acid ester-based solvent satisfies the above range enables the viscosity of the ink to be lowered, thus improving the discharge performance. From the viewpoint of the discharge characteristics, the number of carbon atoms in the fatty acid ester-based solvent is most preferably not more than 22.

Specific examples of the fatty acid ester-based solvent represented by general formula (1) include decyl 2-butyloctanoate (total C22, $R^1$ has a C4 side chain), 2-butyloctyl decanoate (total C22, $R^2$ has a C4 side chain), hexyl 2-hexyldecanoate (total C22, $R^1$ has a C6 side chain), 1-hexyloctyl octanoate (total C22, $R^2$ has a C6 side chain), 1-hexyloctyl nonanoate (total C23, $R^2$ has a C6 side chain), 1-butylhexyl acetate (total C12, $R^2$ has a C4 side chain), 2-hexyldecyl hexanoate (total C22, $R^2$ has a C6 side chain), 2-hexyldecyl heptanoate (total C23, $R^2$ has a C6 side chain), octyl 2-butyloctanoate (total C20, $Rp^1$ has a C4 side chain), hexyl 2-butyloctanoate (total C18, $R^1$ has a C4 side chain), 2-butyloctyl octanoate (total C20, $R^2$ has a C4 side chain), 1-butylhexyl decanoate (total C20, $R^2$ has a C4 side chain), nonyl 2-butyloctanoate (total C21, $R^1$ has a C4 side chain), 2-butyloctyl nonanoate (total C21, $R^2$ has a C4 side chain), and 1-butylhexyl 2-butyloctanoate (total C22, $R^1$ has a C4 side chain and $R^2$ has a C4 side chain).

These compounds may be used individually, or a combination of two or more compounds may be used.

There are no particular limitations on the amount of the fatty acid ester-based solvent represented by general formula (1) relative to the total mass of non-aqueous solvent, but the amount is preferably at least 10% by mass.

From the viewpoint of preventing clear file deformation, in order to eliminate the effects of other solvents, the amount of the fatty acid ester-based solvent represented by general formula (1) relative to the total mass of non-aqueous solvent is preferably at least 50% by mass, more preferably at least 55% by mass, even more preferably at least 80% by mass, and may, for example, be 90% by mass or greater, or even 100% by mass.

The amount of the fatty acid ester-based solvent represented by general formula (1) relative to the total mass of the ink varies depending on the amount used of the total non-aqueous solvent, but is typically within a range from 10 to 98% by mass, and may be within a range from 15 to 90% by mass.

The amount of the fatty acid ester-based solvent represented by general formula (1) relative to the total mass of the ink is preferably at least 20% by mass, more preferably at least 30% by mass, even more preferably at least 50% by mass, and most preferably 55% by mass or greater. This enables even better prevention of clear file deformation.

The amount of fatty acid ester-based solvents of 24 or more carbon atoms in the ink is preferably restricted. For example, the amount of fatty acid ester-based solvents of 24 or more carbon atoms relative to the total mass of the ink is preferably not more than 70% by mass, more preferably not more than 40% by mass, even more preferably not more than 20% by mass, and most preferably 10% by mass or less. This enables the viscosity of the ink to be kept low, thereby further improving the discharge performance.

Moreover, in those cases where the ink contains a fatty acid ester-based solvent having 24 or more carbon atoms, the amount of the fatty acid ester-based solvent represented by general formula (1) relative to the total mass of the ink is preferably at least 50% by mass, more preferably at least 60% by mass, even more preferably at least 80% by mass, and most preferably 90% by mass or greater.

Although not limited to the following method, the fatty acid ester-based solvent represented by general formula (1) described above can be produced using the method described below.

The fatty acid ester-based solvent can be obtained by reacting a fatty acid and an alcohol. A compound having a side chain of at least 4 carbon atoms is used as the raw material for at least one of the fatty acid and the alcohol. Further, in order to introduce a side chain of at least 4 carbon atoms into $R^2$, a secondary alcohol of at least 10 carbon atoms having the hydroxyl group located at position 5 or higher can be used.

The reaction temperature may be adjusted within a range from 80 to 230° C. in accordance with the types of fatty acid and alcohol used. The reaction time may be adjusted within a range from 1 to 48 hours in accordance with the types of fatty acid and alcohol used, and the amounts used of the raw materials. The moisture produced during the esterification reaction is preferably removed.

The fatty acid and the alcohol are preferably reacted in a molar ratio of 1:1.

During the reaction, an appropriate amount of a catalyst such as concentrated sulfuric acid, p-toluenesulfonic acid or methanesulfonic acid may be used.

Examples of fatty acids having a side chain that can be used as a raw material include 2-butyloctanoic acid (C12), 2-hexyldecanoic acid (C16) and 2-octyldodecanoic acid (C20).

Examples of linear fatty acids that can be used as a raw material include acetic acid (C2), butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12) and tetradecanoic acid (C14).

Examples of alcohols having a side chain that can be used as a raw material include 2-butyl-1-octanol (C12), 2-hexyl-1-decanol (C16) and 2-octyl-1-dodecanol (C20).

Examples of linear alcohols of at least 10 carbon atoms having the hydroxyl group located at position 5 or higher that can be used as a raw material include 5-decanol (C10) and 7-tetradecanol (C14).

Examples of linear alcohols that can be used as a raw material include 1-butanol (C4), 1-pentanol (C5), 1-hexanol (C6), 1-heptanol (C7), 1-octanol (C8), 1-nonanol (C9), 1-decanol (C10), 1-undecanol (C11) and 1-dodecanol (C12).

The ink may also contain one or more other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples of the fatty acid ester-based solvents include solvents having a total of at least 12 carbon atoms, and preferably 16 to 30 carbon atoms, including solvents having a linear alkyl group such as methyl laurate, hexyl laurate, hexyl palmitate, methyl oleate, ethyl oleate, butyl oleate, hexyl oleate, methyl linoleate, ethyl linoleate, butyl stearate, hexyl stearate, methyl soybean oil and methyl tallate, and solvents having an alkyl group with a side chain of 3 or fewer carbon atoms, such as isodecyl isononanoate, isotridecyl isononanoate, isopropyl isostearate, isononyl isononanoate, isopropyl laurate, isopropyl myristate, isopropyl palmitate, isooctyl palmitate, isopropyl oleate, isobutyl linoleate, isooctyl stearate, isobutyl soybean oil and isobutyl tallate; as well as solvents having 31 or more carbon atoms such as isostearyl palmitate (34 carbon atoms).

Among those fatty acid ester-based solvents that are generally available commercially, isodecyl isononanoate (19 carbon atoms), isotridecyl isononanoate (22 carbon atoms), and isopropyl isostearate (21 carbon atoms) and the like are examples of fatty acid ester-based solvents having an alkyl group with a side chain of 1 carbon atom.

Examples of the higher alcohol-based solvents include higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol.

Examples of the higher fatty acid-based solvents include higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

When another non-aqueous solvent is used in addition to the fatty acid ester-based solvent represented by general formula (1), in order to prevent clear file deformation, it is preferable that a high-boiling point solvent is used as the other non-aqueous solvent. This high-boiling point solvent is preferably a non-polar solvent having an initial boiling point of at least 200° C., a polar solvent having a boiling point of 250° C. or higher, or a combination of the two. Examples of solvents that can be used favorably as this type of non-aqueous solvent include paraffin-based solvents such as MORESCO White P-60, and fatty acid ester-based solvents having at least 20 carbon atoms in one molecule, such as isotridecyl isononanoate.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s.

There are no particular limitations on the printing method used with the inkjet ink, and any of various printing systems, including a piezo system, electrostatic system or thermal system may be used. In those cases where an inkjet recording device is used, the ink of the present invention is preferably discharged from the inkjet head based on a digital signal, with the discharged ink droplets being adhered to a recording medium.

Because an ink according to an embodiment of the invention has low viscosity that is suitable for discharge from inkjet nozzles, while enabling prevention of clear file deformation, the ink can be discharged favorably in the vicinity of normal temperature (23° C.).

In one embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. However, the present invention is in no way limited by the following examples.

[Synthesis of Fatty Acid Esters]

Formulations of fatty acid esters are shown in Table 1.

A fatty acid and an alcohol were placed in a four-neck flask in accordance with the formulation shown in Table 1 and mixed together to obtain a uniform solution. The four-neck flask was fitted with a Dean-Stark apparatus to enable removal of the water that was generated as the raw materials reacted. An appropriate amount of sulfuric acid was added as a catalyst to the four-neck flask containing the uniform solution, and the entire system was then heated. The heating temperature was set within a range from 80° C. to 230° C. in accordance with the types of fatty acid and alcohol. The heated reaction time was set within a range from 1 to 48 hours. Following reaction, in order to remove any unreacted raw materials and impurities, the obtained solution was distilled under reduced pressure to obtain the target fatty acid ester.

The fatty acid and the alcohol were mixed in a molar ratio of 1:1.

The fatty acids and the alcohols can be obtained from Tokyo Chemical Industry Co., Ltd. and Sasol Group.

In those cases where a commercially available fatty acid ester was used, the supplier is shown in Table 1.

TABLE 1

| | Fatty acid ester | Fatty acid name | Alcohol name |
|---|---|---|---|
| 1 | 1-butylhexyl acetate | acetic acid | 5-decanol |
| 2 | hexyl 2-butyloctanoate | 2-butyloctanoic acid | 1-hexanol |
| 3 | 2-butyloctyl octanoate | octanoic acid | 2-butyl-1-octanol |
| 4 | nonyl 2-butyloctanoate | 2-butyloctanoic acid | 1-nonanol |
| 5 | 2-butyloctyl decanoate | decanoic acid | 2-butyloctanol |
| 6 | 1-butylhexyl 2-butyloctanoate | 2-butyloctanoic acid | 5-decanol |
| 7 | 1-hexyloctyl nonanoate | nonanoic acid | 7-tetradecanol |
| 9 | dodecyl 2-ethylhexanoate | 2-ethylhexanoic acid | 1-dodecanol |
| 10 | 8-methylnonyl dodecanoate | dodecanoic acid | 8-methylnonanol |
| 13 | 2-butyloctyl 2-butyloctanoate | 2-butyloctanoic acid | 2-butyl-1-octanol |
| 14 | decyl 2-hexyldecanoate | 2-hexyldecanoic acid | 1-decanol |
| 15 | 2-octyldodecyl hexanoate | hexanoic acid | 2-octyl-1-dodecanol |
| 16 | 2-hexyldecyl 2-butyloctanoate | 2-butyloctanoic acid | 2-hexyl-1-decanol |
| 17 | 2-octyldodecyl decanoate | decanoic acid | 2-octyl-1-dodecanol |
| 8 | hexyl dodecanoate | EXCEPARL HL, Manufactured by Kao Corporation | |
| 11 | 11-methyldodecyl 3,5,5-trimethylhexanoate | KAK139, manufactured by Kokyu Alcohol Kogyo Co., Ltd. | |
| 12 | 2-hexyldecyl 2-ethylhexanoate | ICEH, manufactured by Kokyu Alcohol Kogyo Co., Ltd. | |

[Preparation of Inks]

Ink formulations are shown in Table 2, Table 3 and Table 4. The number of carbon atoms (C number) in one molecule of the fatty acid ester, and the number of carbon atoms (C number), the number of side chains and the number of carbon atoms (C number) in each side chain for each of $R^1$ and $R^2$ are also shown in each table.

The pigments, pigment dispersants, and solvents were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The components used were as follows.

(Pigments)

Carbon black: MA77, manufactured by Mitsubishi Chemical Corporation.

Copper phthalocyanine blue: FASTOGEN Blue LA5380, manufactured by DIC Corporation.

(Pigment Dispersants)

Solsperse 13940: manufactured by The Lubrizol Corporation, non-volatile fraction: 40% by mass.

Solsperse 18000: manufactured by The Lubrizol Corporation, non-volatile fraction: 100% by mass.

(Hydrocarbon Solvent)

Petroleum-based hydrocarbon solvent: MORESCO White P-60, a naphthene-based solvent, manufactured by MORESCO Corporation.

[Evaluations]

The inks from each of the examples and comparative examples described above were evaluated using the methods described below. The evaluation results are shown in Table 2, Table 3 and Table 4.

(Polypropylene Swelling Characteristics)

A 5 cm×1 cm sample was cut from a polypropylene (PP) clear file with a thickness of about 0.2 mm to prepare a test piece. First, the mass (a) of this test piece was measured. Subsequently, the test piece was immersed in the ink and left to stand for one week at room temperature. After standing for one week, the mass (b) of the test piece was re-measured.

The percentage change in the mass [(b−a)/a]×100 was determined from the change in the mass of the test piece, and the polypropylene swelling characteristics were evaluated against the following criteria.

A: less than +0.8%
B: at least 0.8% but less than +1.2%
C: +1.2% or greater (Ink Volatility)

A 5 g sample of each ink was placed in a glass bottle with a diameter of 3.5 cm and left to stand for one week in the open atmosphere at 70° C., with the mass of the ink being measured before and after the standing period. The percentage change in mass of the ink was determined from the formula shown below, and the ink volatility was evaluated against the following criteria.

Percentage change in mass of ink={1−(mass of ink after standing)/(mass of ink before standing)}×100(%)

A: less than 5.0%
C: 5.0% or greater (Discharge Performance)

Evaluation of the discharge performance was performed using a line-type inkjet printer "ORPHIS EX9050" (a product name, manufactured by RISO KAGAKU CORPORATION), by consecutively printing 100 single-sided solid images of about 51 mm in the main scanning direction×260 mm in the sub-scanning direction onto a plain paper "RISO Paper Thin Type" (manufactured by RISO KAGAKU CORPORATION), and then evaluating the printed items visually.

Ink discharge faults from the inkjet nozzles can be confirmed by the occurrence of unprinted portions that appear as white bands in the printed item. Whether or not these white bands appeared, and if present, how many bands occurred, within the 100 printed items was determined by visual inspection. The discharge performance was evaluated on the basis of the total number of white bands observed across the 100 printed items. The evaluation criteria were as follows.

A: no white bands
B: 1 to 4 white bands
C1: 5 to 9 white bands C2: 10 or more white bands (Ink Odor)

Printed items were produced in the same manner as that described above for the evaluation of the discharge performance. Each printed item was sealed inside a PET film, left to stand for one week in an atmosphere at a temperature of 30° C. and a humidity of 85%, and then evaluated for odor. The odor evaluation was performed by having 10 panelists smell the printed item and perform a sensory evaluation against the following criteria. The evaluation result was recorded as the average of the evaluation results from the 10 panelists.

A: almost no odor is detectable
B: an odor is noticeable

Although a detailed description is not provided here, printing using the inks of each of the examples was able to produce printed items of satisfactory print density. Further, the viscosity of the ink from each example was also appropriate.

TABLE 2

Ink formulations and evaluation results

| | | C number of one molecule of ester | R¹ C number | R¹ Number of side chains | R¹ C number of side chain | R² C number | R² Number of side chains | R² C number of side chain | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|---|---|---|---|
| Units: % by mass | | | | | | | | | | | | | | | | | | | | |
| Pigments | Carbon black | | | | | | | | 5.00 | 5.00 | 5.00 | 5.00 | 5.00 | 5.00 | 5.00 | — | 5.00 | 5.00 | 5.00 |
| | Copper phthalocyanine blue | | | | | | | | — | — | — | — | — | — | — | 4.00 | — | — | — |
| Pigment dispersants | Solsperse 13940 (Active component: 40%) | | | | | | | | 5.00 (2.00) | 5.00 (2.00) | 5.00 (2.00) | 5.00 (2.00) | 5.00 (2.00) | 5.00 (2.00) | 5.00 (2.00) | — | 5.00 (2.00) | 5.00 (2.00) | 5.00 (2.00) |
| | Solsperse 18000 | | | | | | | | — | — | — | — | — | — | — | 3.50 | — | — | — |
| Fatty acid esters | (1) 1-butyl-hexyl acetate | 12 | 1 | 0 | 0 | 10 | 1 | 4 | 90.00 | — | — | — | — | — | — | — | — | — | — |
| | (2) hexyl 2-butyl-octanoate | 18 | 11 | 1 | 4 | 6 | 0 | 0 | — | 90.00 | — | — | — | — | — | — | — | — | — |
| | (3) 2-butyl-octyl octanoate | 20 | 7 | 0 | 0 | 12 | 1 | 4 | — | — | 90.00 | — | — | — | — | — | — | — | — |
| | (4) nonyl 2-butyl-octanoate | 21 | 11 | 1 | 4 | 9 | 0 | 0 | — | — | — | 90.00 | — | — | — | — | 45.00 | — | — |
| | (5) 2-butyl-octyl decanoate | 22 | 9 | 0 | 0 | 12 | 1 | 4 | — | — | — | — | 90.00 | — | — | 92.50 | 45.00 | 50.00 | 30.00 |

TABLE 2-continued

| | | C number of one molecule of ester | R¹ C number | R¹ Number of side chains | R¹ C number of side chain | R² C number | R² Number of side chains | R² C number of side chain | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|---|---|---|---|
| Units: % by mass | | | | | | | | | | | | | | | | | | | | |
| | (6) 1-butyl-hexyl 2-butyl-octanoate | 22 | 11 | 1 | 4 | 10 | 1 | 4 | — | — | — | — | — | 90.00 | — | — | — | — | — |
| | (7) 1-hexyl-octyl nonanoate | 23 | 8 | 0 | 0 | 14 | 1 | 6 | — | — | — | — | — | — | 90.00 | — | — | — | — |
| Hydrocarbon-based solvent | MORESCO White P-60 | | | | | | | | — | — | — | — | — | — | — | — | — | 40.00 | 60.00 |
| | Total (% by mass) | | | | | | | | 100.00 | 100.00 | 100.00 | 100.00 | 100.00 | 100.00 | 100.00 | 100.00 | 100.00 | 100.00 | 100.00 |
| | PP swelling characteristics | | | | | | | | A | A | A | A | A | A | A | A | A | A | B |
| | Ink volatility | | | | | | | | B | B | A | A | A | A | A | A | A | A | A |
| | Discharge performance | | | | | | | | A | A | B | A | A | A | B | A | A | B | B |
| | Odor | | | | | | | | B | B | B | A | A | A | B | A | A | A | A |

TABLE 3

Ink formulations and evaluation results

| Units: % by mass | | C number of one molecule of ester | R¹ C number | R¹ Number of side chains | R¹ C number of side chain | R² C number | R² Number of side chains | R² C number of side chain | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|
| Pigments | Carbon black | | | | | | | | 5.00 | 5.00 | 5.00 | 5.00 | 5.00 | 5.00 |
| | Copper phthalocyanine blue | | | | | | | | — | — | — | — | — | — |
| Pigment dispersants | Solsperse 13940 (Active component: 40%) | | | | | | | | 5.00 (2.00) | 5.00 (2.00) | 5.00 (2.00) | 5.00 (2.00) | 5.00 (2.00) | 5.00 (2.00) |
| | Solsperse 18000 | | | | | | | | — | — | — | — | — | — |
| Fatty acid esters | (8) hexyl dodecanoate | 18 | 11 | 0 | 0 | 6 | 0 | 0 | 90.00 | — | — | — | — | — |
| | (9) dodecyl 2-ethylhexanoate | 20 | 7 | 1 | 2 | 12 | 0 | 0 | — | 90.00 | — | — | — | — |
| | (10) 8-methylnonyl dodecanoate | 22 | 11 | 0 | 0 | 10 | 1 | 1 | — | — | 90.00 | — | — | — |
| | (11) 11-methyldodecyl 3,5,5-trimethyhexanoate | 22 | 8 | 3 | 1, 1, 1 | 13 | 1 | 1 | — | — | — | 90.00 | — | — |
| | (12) 2-hexyldecyl 2-ethylhexanoate | 24 | 7 | 1 | 2 | 16 | 1 | 6 | — | — | — | — | 90.00 | — |
| Hydrocarbon-based solvent | MORESCO White P-60 | | | | | | | | — | — | — | — | — | 90.00 |
| Total (% by mass) | | | | | | | | | 100.00 | 100.00 | 100.00 | 100.00 | 100.00 | 100.00 |
| PP swelling characteristics | | | | | | | | | C | C | C | C | A | C |
| Ink volatility | | | | | | | | | B | A | A | A | A | A |
| Discharge performance | | | | | | | | | A | A | A | A | C1 | C2 |
| Odor | | | | | | | | | B | B | A | B | B | A |

TABLE 4

Ink formulations and evaluation results

| Units: % by mass | | C number of one molecule of ester | R¹ C number | R¹ Number of side chains | R¹ C number of side chain | R² C number | R² Number of side chains | R² C number of side chain | Comparative Example 7 | Comparative Example 8 | Comparative Example 9 | Comparative Example 10 | Comparative Example 11 |
|---|---|---|---|---|---|---|---|---|---|---|---|---|---|
| Pigments | Carbon black | | | | | | | | 5.00 | 5.00 | 5.00 | 5.00 | 5.00 |
| | Copper phthalocyanine blue | | | | | | | | — | — | — | — | — |
| Pigment dispersants | Solsperse 13940 (Active component: 40%) | | | | | | | | 5.00 (2.00) | 5.00 (2.00) | 5.00 (2.00) | 5.00 (2.00) | 5.00 (2.00) |
| | Solsperse 18000 | | | | | | | | — | — | — | — | — |
| Fatty acid esters | (13) 2-butyloctyl 2-butyloctanoate | 24 | 11 | 1 | 4 | 12 | 1 | 4 | 90.00 | — | — | — | — |
| | (14) decyl 2-hexyldecanoate | 26 | 15 | 1 | 6 | 10 | 0 | 0 | — | 90.00 | — | — | — |
| | (15) 2-octyldodecyl hexanoate | 26 | 5 | 0 | 0 | 20 | 1 | 8 | — | — | 90.00 | — | — |

TABLE 4-continued

Ink formulations and evaluation results

| Units: % by mass | | C number of one molecule of ester | R¹ C number | R¹ Number of side chains | R¹ C number side of chain | R² C number | R² Number of side chains | R² C number of side chain | Comparative Example 7 | Comparative Example 8 | Comparative Example 9 | Comparative Example 10 | Comparative Example 11 |
|---|---|---|---|---|---|---|---|---|---|---|---|---|---|
| | (16) 2-hexyldecyl 2-butyloctanoate | 26 | 11 | 1 | 4 | 16 | 1 | 6 | — | — | — | 90.00 | - |
| | (17) 2-octyldodecyl decanoate | 30 | 9 | 0 | 0 | 20 | 1 | 8 | — | — | — | — | 90.00 |
| Hydrocarbon-based solvent | MORESCO White P-60 | | | | | | | | — | — | — | — | — |
| Total (% by mass) | | | | | | | | | 100.00 | 100.00 | 100.00 | 100.00 | 100.00 |
| PP swelling characteristics | | | | | | | | | A | A | A | A | A |
| Ink volatility | | | | | | | | | A | A | A | A | A |
| Discharge performance | | | | | | | | | C1 | C1 | C1 | C1 | C1 |
| Odor | | | | | | | | | A | A | B | A | A |

As shown in the tables, with the inks of the Examples, swelling of the polypropylene (PP) was prevented, and the discharge performance was able to be improved.

Because PP swelling by the ink is prevented, when a printed item is inserted in a clear file formed from PP, the inside surface of the clear file that contacts the printed surface can be prevented from swelling due to the effects of the ink components, and particularly the solvent. Accordingly, any change in volume between the inside surface and the outside surface of the clear file can be avoided, thus enabling deformation of the clear file to be prevented.

In Examples 1 to 7, various fatty acid esters were used, and in each case, PP swelling was prevented and the discharge performance was able to be improved. Based on Examples 1 to 7, it is evident that the discharge performance improves even further when the number of carbon atoms in one molecule of the fatty acid ester is 22 or fewer.

Based on Examples 1 to 7, it is evident that the ink volatility improves further when the number of carbon atoms in one molecule of the fatty acid ester is at least 20.

Based on Examples 1 to 7, it is evident that the ink odor improves further when the number of carbon atoms in each of the two alkyl chains of the fatty acid ester is at least 9.

Example 8 is an example in which the pigment and pigment dispersant have been changed from Example 5, and each of the evaluations was favorable.

Example 9 is an example in which two fatty acid esters were used, and each of the evaluations was favorable.

Examples 10 and 11 are examples in which a combination of a fatty acid ester and a hydrocarbon solvent was used, whereas Comparative Example 6 is an example in which no fatty acid ester was used, and only a hydrocarbon solvent was used. Based on the results of these examples, it is evident that the discharge performance deteriorates as the amount of the fatty acid ester is reduced, and that PP swelling tends to occur more readily as the amount of the fatty acid ester is reduced.

In each of Comparative Examples 1 to 4, a fatty acid ester having a side chain containing 3 or fewer carbon atoms was used, and PP swelling occurred.

In Comparative Example 5, a fatty acid ester having 24 carbon atoms in one molecule was used, and the discharge characteristics of the ink deteriorated.

Moreover, in Comparative Examples 1 to 5, the ink volatilized more readily as the number of carbon atoms in one molecule of the fatty acid ester decreased, and ink odor became more of a problem as the number of carbon atoms in the alkyl group of the fatty acid ester decreased.

In Comparative Examples 7 to 11, the number of carbon atoms in one atom of the fatty acid ester was 24 or greater, and the discharge performance of the ink deteriorated.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a colorant and a fatty acid ester-based solvent represented by general formula (1) shown below:

General formula (1)

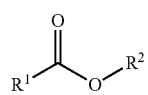

wherein (i) each of $R^1$ and $R^2$ independently represents an alkyl group of at least 8 carbon atoms, and at least one of the alkyl groups of $R^1$ and $R^2$ is a branched alkyl group having a side chain of at least 4 carbon atoms and the fatty acid ester-based solvent has 18 to 23 carbon atoms in one molecule, or (ii) each of $R^1$ and $R^2$ independently represents an alkyl group, each of $R^1$ and $R^2$ independently represents a branched alkyl group having a side chain of at least 4 carbon atoms and wherein the fatty acid ester-based solvent has 20 to 23 carbon atoms in one molecule.

2. The oil-based inkjet ink according to claim 1, wherein the general formula (1) satisfies the condition (i), and a number of carbon atoms in one molecule of the fatty acid ester-based solvent is from 18 to 22.

3. The oil-based inkjet ink according to claim 1, wherein a number of carbon atoms in one molecule of the fatty acid ester-based solvent is from 20 to 22.

4. The oil-based inkjet ink according to claim 1, wherein each of $R^1$ and $R^2$ independently represents an alkyl group of at least 9 carbon atoms.

5. The oil-based inkjet ink according to claim 1, wherein the general formula (1) satisfies the condition (ii).

6. The oil-based inkjet ink according to claim 1, wherein an amount of the fatty acid ester-based solvent is at least 50% by mass relative to a total mass of the ink.

7. The oil-based inkjet ink according to claim 2, wherein one of $R^1$ and $R^2$ is a branched alkyl group having a side chain of at least 4 carbon atoms, and another of $R^1$ and $R^2$ is a linear alkyl group.

8. The oil-based inkjet ink according to claim 3, wherein the general formula (1) satisfies the condition (i), one of $R^1$ and $R^2$ is a branched alkyl group having a side chain of at least 4 carbon atoms, and another of $R^1$ and $R^2$ is a linear alkyl group.

9. The oil-based inkjet ink according to claim 7, wherein each of $R^1$ and $R^2$ independently represents an alkyl group of at least 9 carbon atoms.

10. The oil-based inkjet ink according to claim 8, wherein each of $R^1$ and $R^2$ independently represents an alkyl group of at least 9 carbon atoms.

11. The oil-based inkjet ink according to claim 3, wherein the general formula (1) satisfies the condition (ii).

12. The oil-based inkjet ink according to claim 1, wherein the general formula (1) satisfies the condition (i).

13. The oil-based inkjet ink according to claim 1, wherein each of $R^1$ and $R^2$ independently represents an alkyl group having a main chain of 10 carbon atoms or fewer.

14. The oil-based inkjet ink according to claim 1, wherein the colorant contains at least one selected from the group consisting of azo pigments, phthalocyanine pigments, polycyclic pigments, dye lake pigments, carbon blacks and metal oxides.

15. An oil-based inkjet ink comprising a colorant and a fatty acid ester-based solvent represented by general formula (1) shown below:

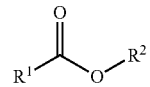

General formula (1)

wherein each of $R^1$ and $R^2$ independently represents an alkyl group of at least 8 carbon atoms, one of the alkyl groups of $R^1$ and $R^2$ is a branched alkyl group having a side chain of at least 4 carbon atoms, another of $R^1$ and $R^2$ is a linear alkyl group, and the fatty acid ester-based solvent has 18 to 23 carbon atoms in one molecule.

16. An oil-based inkjet ink comprising a colorant and a fatty acid ester-based solvent represented by general formula (1) shown below:

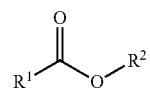

General formula (1)

wherein each of $R^1$ and $R^2$ independently represents an alkyl group of 8 to 14 carbon atoms, at least one of the alkyl groups of $R^1$ and $R^2$ is a branched alkyl group having n-butyl group or hexyl group as a side chain, and the fatty acid ester-based solvent has 18 to 23 carbon atoms in one molecule.

* * * * *